United States Patent [19]
Shimanovich et al.

[11] Patent Number: 5,990,587
[45] Date of Patent: Nov. 23, 1999

[54] LOW FRICTION, HIGH PRECISION ACTUATOR

[75] Inventors: Michael Shimanovich, Woodhaven, N.Y.; Reggie J. Caudill, Princeton, N.J.; Timothy N. Chang, Pompton Plains, N.J.; Zhiming Ji, Whippany, N.J.

[73] Assignee: New Jersey Institute of Technology, Newark, N.J.

[21] Appl. No.: 08/883,832

[22] Filed: Jun. 27, 1997

[51] Int. Cl.⁶ .......................... H02K 7/06; H02K 41/00; H02K 7/09; F16H 1/18
[52] U.S. Cl. .......................... 310/80; 310/12; 310/90.5; 310/103; 74/424.8 R
[58] Field of Search .......................... 310/80, 12, 90, 310/90.5, 103, 20; 74/424.8 R

[56] References Cited

U.S. PATENT DOCUMENTS

| | | | |
|---|---|---|---|
| 3,777,587 | 12/1973 | Hoshina et al. | 74/428 R |
| 3,824,420 | 7/1974 | Stegeman et al. | 310/89 |
| 4,123,691 | 10/1978 | Seilly | 318/119 |
| 4,145,625 | 3/1979 | Seilly | 310/27 |
| 4,214,180 | 7/1980 | Kuwako et al. | 310/80 |
| 4,439,702 | 3/1984 | Belikov et al. | 310/80 |
| 4,712,027 | 12/1987 | Karidis et al. | 310/12 |
| 4,734,605 | 3/1988 | Hayashi | 310/80 |
| 4,741,220 | 5/1988 | Watanbe et al. | 74/424.6 |
| 4,841,204 | 6/1989 | Studer | 318/254 |
| 4,869,626 | 9/1989 | Kosmowski | 408/129 |
| 4,920,292 | 4/1990 | Albrecht et al. | 310/114 |
| 5,099,161 | 3/1992 | Wolfbauer, III | 310/80 |
| 5,130,585 | 7/1992 | Iwamatsu et al. | 310/59 |
| 5,177,387 | 1/1993 | McMichael et al. | 310/90.5 |
| 5,179,304 | 1/1993 | Kenjo et al. | 310/12 |
| 5,331,861 | 7/1994 | Joffe | 74/89.15 |

OTHER PUBLICATIONS

Kikuchi et al. (1993) IEEE Trans. on Magnetics 29:2923–5.
Koyo Magnet Screw, Koyo Machine Industrie Co. catalog.
i, T. (1987) World Congress of IFToMM, pp. 1545–1548.

*Primary Examiner*—Elvin G. Enad
*Assistant Examiner*—Dang Dinh Le
*Attorney, Agent, or Firm*—Klauber & Jackson

[57] ABSTRACT

In one embodiment, a device for generating ultra-high precision rectilinear movement based on aerostatic suspension and magnetic traction, the device including a nut, a leadscrew, a thrust bearing, a contactless motor, and feedback drive electronics. The contactless motor provides the actuation by turning the leadscrew which is made of magnetically soft materials and has a pitched helical groove machined on its surface. The leadscrew passes through the core of the nut which is free to move in a rectilinear motion on a aerostatically suspended guide. The nut, also made with magnetic material, has a matching helical groove in its core so that a closed magnetic circuit is formed between the grooves of the leadscrew and the nut. The closed circuit in turn provides the necessary magnetic traction to move the nut in a rectilinear fashion. A primary aerostatic suspension is utilized to stabilize and center the leadscrew and nut transversally. A secondary transversal stabilization is provided by the thrust bearing to center the leadscrew in the axial direction. The nut is vibrationally isolated and can be rectilinearly moved with precision. Thus, all surface friction is eliminated, thereby reducing friction to that generated by air.

32 Claims, 6 Drawing Sheets

LOW FRICTION, HIGH PRECISION ACTUATOR

FIELD OF THE INVENTION

The present invention relates to precision mechanical drive systems generally and, more particularly, but not by way of limitation, to a novel contactless drive system.

BACKGROUND OF THE INVENTION

It is well recognized that ultra-high precision assembly or manufacturing, typically requiring up to 10 nanometers linear resolution, is of strategic importance to industrial processes such as optoelectronics assembly, precision machining, and semiconductor manufacturing. In such processes, both the machine dynamics and operating environment are critical to the quality of the end product. "Hard" nonlinearities such as surface friction, backlash, and hysteresis are generally difficult to predict and to compensate for, resulting in significant degradation of the process performance.

To eliminate thread friction and wear and provide damping on the axis of motion, hydrostatic and aerostatic leadscrews have been used to replace conventional ball or roller leadscrews in manufacturing machines. For example, at least one known device utilizes a hydrostatic leadscrew for behind-the-wheel dressing system with a claimed resolution of 10 nanometers. Satomi studied the use of aerostatic leadscrew as a positioning and guiding system for machine tools. See "Studies on aerostatic lead screws," T. Satomi, World Congress of IFToMM, 1987, pp. 1545–1548. These approaches use pressurized fluids to separate enmeshed, i.e., mechanically coupled, threads.

On the other hand, magnetic coupling has also been investigated for achieving contactless drives. For example, Kikuchi and Tsurumoto experimented with a permanent magnet worm gear. See "Design and characteristics of a new magnetic worm gear using permanent magnet," IEEE Trans. on Magnetics, Vol. 29, No. 6, 1993, pp. 2923–2925. Various other linear actuators are described in the following patents, all of which are incorporated herein in their entirety: U.S. Pat. No. 3,777,587 issued to Hoshina et al.; U.S. Pat. No. 3,824,420 issued to Stegeman et al.; U.S. Pat. No. 4,123,691 issued to Seilly; U.S. Pat. No. 4,145,625 issued to Seilly; U.S. Pat. No. 4,214,180 issued to Kuwako et al.; U.S. Pat. No. 4,439,702 issued to Belikov et al.; U.S. Pat. No. 4,712,027 issued to Karidis; U.S. Pat. No. 4,734,605 issued to Hayashi; U.S. Pat. No. 4,920,292 issued to Albrecht et al.; and U.S. Pat. No. 5,099,161 issued to Wolfbauer, III.

Therefore, it is a principal object of the present invention to provide a means of generating high or ultra-high precision movement It is another object of the present invention to provide a means of generating high or ultra-high precision movement based on the principle of magnetic traction and aerostatic suspension.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a particular embodiment, a low-friction, high precision device for transforming rotational motion into rectilinear motion. The device comprises a rotatable male element, a female element, and means for supporting the female element. The female element is adapted to fit over the male element such that the female element is separated from the male element by a first pressurized gap, wherein the female element is cushioned upon the first pressurized gap. The means for supporting the female element supports the female element upon a second pressurized gap and allows the female element to translate parallel to the male element while preventing the female element from rotating, wherein rotation of the female element is capable of being resisted by the second pressurized gap. Thus, the female element is suspended by the first and second pressurized gaps, and the female element is vibrationally isolated. Furthermore, the male and female elements are magnetically coupled across the first pressurized gap. Rotation of the male element is capable of causing the female element to translate parallel to the male element by magnetic traction, whereby translation of the female element is substantially frictionless.

The male element may include a magnetic source for inducing a magnetic circuit between the male and female elements. Alternatively, the female element may include a magnetic source for inducing a magnetic circuit between the male and female elements.

In another embodiment, the present invention relates to a low-friction, high precision device for transforming rotational motion into rectilinear motion comprising a male element, a female element, and a guide element.

The female element is adapted to fit over the male element such that the female element is separated from the male element by a first gap, the female element including gas inlet means for allowing compressed gas to enter the first gap, thereby allowing the formation of a first gas support cushion between the male and female elements, whereby the first cushion is capable of maintaining the separation of the male and female elements.

The guide element allows the female element to translate parallel to the male element and prevents the female element from rotating, wherein the guide element and the female element are separated by a second gap. The guide element includes gas inlet means for allowing the compressed gas to enter the second gap, thereby allowing the formation of a second gas support cushion between the female element and the guide element, whereby rotation of the female element is capable of being resisted by the second cushion.

Thus, the female element is capable of being suspended by the first and second cushions.

The male and female elements are magnetically coupled. Rotation of the male element is capable of causing the female element to translate parallel to the male element by magnetic traction, whereby translation of the female element is substantially frictionless, and whereby the female element is vibrationally isolated.

The device may further comprise a contactless bearing, wherein at least one end of the male element is rotatably mounted in the contactless bearing. The contactless bearing may further comprise means for providing a gas cushion to resist axial thrust loads. The contactless bearing may further comprise means for providing a gas cushion to resist transverse journal loads.

The device may also comprise control means for translating the female element to a desired position. The control means may include means for sensing the absolute position of the female element.

The male and female elements preferably include matching magnetic portions helically disposed on opposite sides of the first gap.

The outer surface of the male element corresponding to its magnetic portion is preferably substantially smooth, and the inner surface of the female element corresponding to its magnetic portion is preferably substantially smooth.

In a particular embodiment, the female element is aerostatically suspended.

The male element may be an elongate shaft. The female element may have the form of a nut.

The device may include a contactless motor for rotating the male element.

In yet another embodiment, the present invention concerns a drive system comprising a compressed air source, a drive motor having a rotor and a stator, a leadscrew attached to the rotor, and a nut. The leadscrew has an outer surface including a magnetizable portion with a helical flange defining a first helical groove, the magnetizable portion having an outer diameter.

The nut has the following: an outer surface; an inner radial surface, including a magnetizable portion with a helical flange defining a second helical groove, wherein the first helical groove matches the second helical groove, and wherein the magnetizable portion has an inner diameter greater than the outer diameter of the magnetizable portion of the leadscrew, thereby forming a gap between the nut and the leadscrew; and a magnetic source disposed between the inner radial surface and the outer surface. The nut is provided with at least one air passage between the outer surface and the inner radial surface.

The compressed air source is connected to the air passage to provide air to the gap, thereby creating an air cushion between the nut and the leadscrew, whereby the nut is substantially prevented from contacting the leadscrew. The magnetic source induces a closed magnetic circuit through the magnetizable portion of the nut and the magnetizable portion of the leadscrew. Rotation of the leadscrew causes the helical flange of the magnetizable portion of the leadscrew to magnetically attract the helical flange of the magnetizable portion of the nut, thereby causing the nut to translate rectilinearly along the leadscrew.

The drive system may further comprise a guide means for substantially preventing the nut from rotating. The guide means may include a slide attached to the nut and a slide guide adapted to allow the nut to travel rectilinearly therethrough. The slide and the slide guide are substantially preventing from contacting each other by a cushion of compressed air maintained therebetween.

The motor is preferably a contactless motor, and a contactless bearing supports the rotor.

The inner radial surface of the nut may comprise at least one nonmagnetic portion.

The first helical groove is preferably filled with a nonmagnetic filler material. Further preferably, the first helical groove is filled with a nonmagnetic filler material until flush with the helical flange, thereby imparting a smooth finish to the outer surface of the leadscrew.

Similarly, the second helical groove is preferably filled with a nonmagnetic filler material. The second helical groove is preferably filled with a nonmagnetic filler material until flush with the helical flange, thereby imparting a smooth finish to the inner radial surface of the nut.

The inner radial surface of the nut may be provided with an indented portion which forms an air pocket between the nut and the leadscrew.

The magnetic source may be a permanent magnet or an electromagnet.

In still another embodiment, the present invention relates to a nut assembly comprising a housing, ring-shaped magnet means, first and second nut members, and first and second pairs of non-magnetic rings. The housing is provided with an axial borehole and at least first and second transverse holes radially extending from an outer periphery to the borehole. The ring-shaped magnet means is disposed within the borehole between the first and second transverse holes. The first nut member has an internal magnetizable thread, the nut member being disposed on a first side of the magnet means, wherein the first nut member is provided with a first transverse hole which is aligned with the first transverse hole in the housing. The second nut member has an internal magnetizable thread, the nut member being disposed on a second side of the magnet means, wherein the second nut member is provided with a second transverse hole which is aligned with the second transverse hole in the housing. The first pair of non-magnetic rings is disposed axially outward from the first nut member, wherein the first pair of rings are axially separated from each other by a first pocket which communicates with the first transverse hole in the first nut member. The second pair of non-magnetic rings is disposed axially outward from the second nut member, wherein the second pair of rings are axially separated from each other by a second pocket which communicates with the second transverse hole in the second nut member. The first and second nut members, the first and second pairs of non-magnetic rings, and the magnet means are axially aligned and define an axial throughhole. The first and second pockets communicate with the axial throughhole. The magnet means magnetically couples the first and second nut members.

The magnet means may be an electromagnet or a permanent magnet.

The present invention also concerns the combination of the above-described nut assembly, a shaft disposed within the axial throughhole and separated therefrom by a gap, and a source of pressurized gas, wherein the pressurized gas is introduced into the first and second transverse holes in the housing, through the first and second nut members, through the first and second pockets and into the gap around the shaft, thereby suspending the shaft by a pressurized gas cushion.

The present invention may further include in the above combination a contactless motor assembly connected to the shaft for rotating the shaft in precise increments. The contactless motor assembly is preferably a contactless bearing for centering and stabilizing the shaft.

In another aspect, the present invention relates to a method for precisely transforming rotational motion of a first element into rectilinear motion of a second element, the method comprising the steps of aerostatically suspending the second element while simultaneously preventing the second element from rotating; magnetically coupling the first and second elements; and rotating the first element.

The method may further include aerostatically suspending the first element. The method may still further include rotating the first element with a contactless motor.

BRIEF DESCRIPTION OF THE DRAWINGS

Understanding of the present invention and the various aspects thereof will be facilitated by reference to the accompanying drawing figures, submitted for purposes of illustration only and not intended to limit the scope of the invention, in which:

FIG. 3 shows rotation of the male element or shaft.

FIG. 4 shows linear motion of the shaft and nut.

FIGS. 6–7 illustrate another preferred embodiment of the magnetic nut assembly according to the present invention.

FIG. 6 is an exploded perspective view of a magnetic nut assembly according to the present invention.

FIG. 7b is a cross-sectional view of the magnetic nut assembly of FIG. 7a.

DETAILED DESCRIPTION OF THE PREFERRED EMBODIMENTS

Figure 1A:
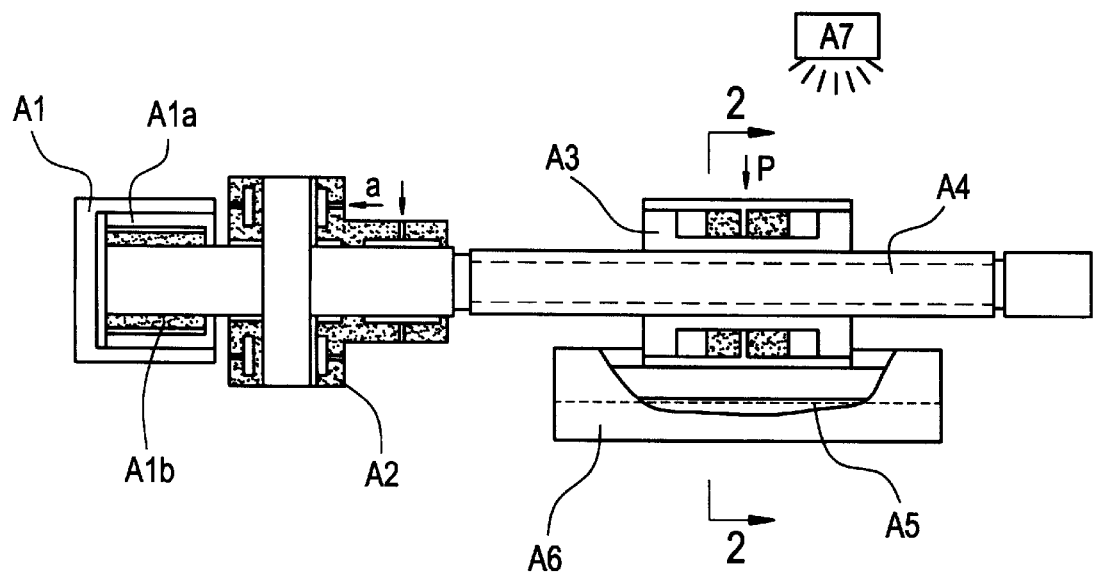
FIG. 1 illustrates one preferred embodiment of a contactless drive system according to the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may also be seen on other views.

Figure 1B:
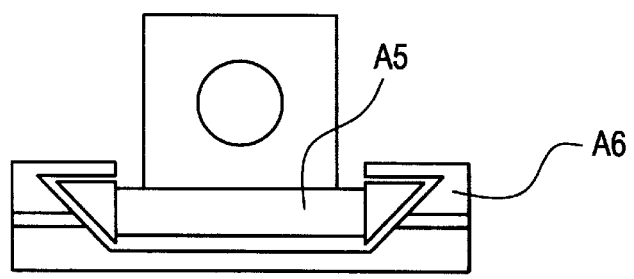

FIG. 1 illustrates one preferred embodiment of a contactless drive system according to the present invention. This system includes a contactless drive motor or drive motor assembly A1 having a stator A1a and rotor A1b, a magnetic or magnetizable leadscrew A4, a magnetic or magnetizable nut A3, a contactless thrust bearing A2, a slide A5, a slide guide A6 and a sensor A7 for measuring the absolute nut position and which is connected to feedback drive electronics. The nut and slide are further preferably equipped with aerostatic bearings. FIG. 1(a) shows a side view of the system with the motor and slide guide partially cut away. FIG. 1(b) shows an end view of the nut, slide and a slide guide.

Conventional motors include, for example, a rotor and a stator separated by a mechanical bearing, resulting in contact friction therebetween. On the other hand, "contactless motors", as used herein in connection with the present invention, do not possess such bearings. Rather, the rotor and stator of the contactless motor are supported by a cushion of gas, such as that provided by an air thrust bearing.

In one preferred embodiment, the leadscrew and nut of the present invention are preferably made of soft magnetic material with fine rectangular thread, whose spacing is filled with non-magnetic epoxy. Permanent magnets or electromagnetic means are joined to the nut to supply energy to the magnetic circuit formed by the leadscrew and nut. The operating point and the subsequent performance of the magnets depend on the physical installation of the magnetic circuit and the magnetization of the magnetic circuit after assembly. For example, the performance of an embodiment of the present invention would be typically dependent upon the properties of the magnets, whether permanent or electromagnetic, the size and dimensions of the matching threads of the leadscrew and nut, and the size or dimensions of the air gap between the leadscrew and the nut.

The leadscrew is preferably aerostatically supported or suspended. Thus, the aerostatic leadscrew may be supported on one end by a combination of externally pressurized air journal and thrust bearing. The leadscrew is also supported by the nut, with the nut acting as an externally pressurized air journal bearing. The nut moves within the slide guide through a rectilinear air bearing as provided by the cushion of air maintained between the slide, which is attached to, or integral with, the nut, and its corresponding slide guide.

Figure 2:
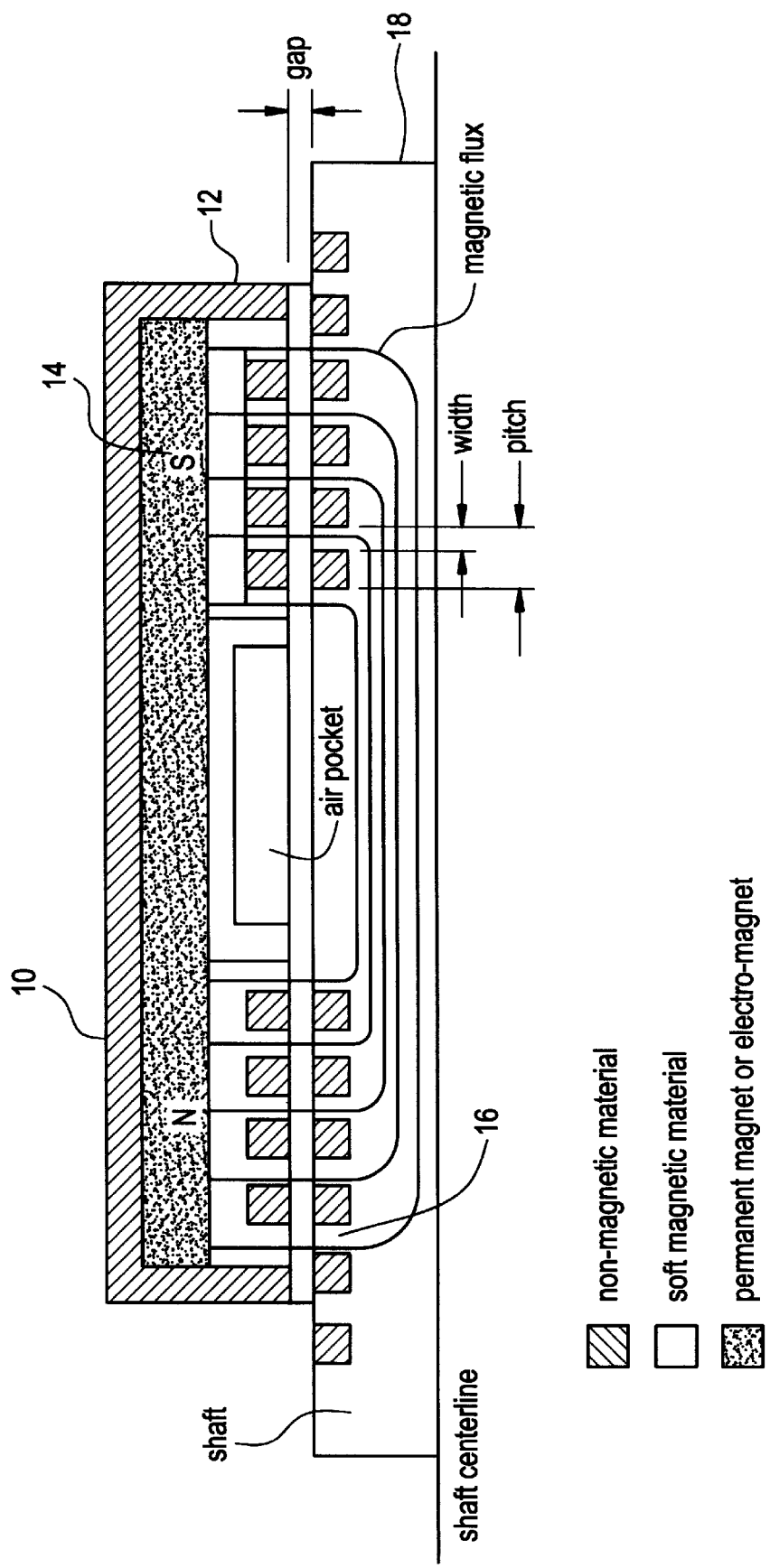
FIG. 2 schematically illustrates a leadscrew and a nut according to the present invention.

FIG. 2 schematically illustrates a leadscrew and a nut according to the present invention. The nut or nut assembly 10 includes an outer casing or housing 12, a magnetic means 14, and first and second internally threaded members 16 and 17. The magnet, which may be a permanent magnet or electromagnet, is shown shaped as an annulus disposed within the housing. The threaded portions 16 and 17 are disposed on opposite sides of an internal surface of the housing which defines an indentation or pocket. The threaded portions include helical threads, preferably having a rectangular profile, of soft magnetic material.

The spaces between the thread flanges are preferably filled with a non-magnetic material. The spaces between the thread flanges 16 and 17 are further preferably filled until the nonmagnetic material reaches the top or distal end of the flanges, so that the internal surface of the nut assembly preferably has a generally smooth contour, in order to provide an adequately smooth and uniform surface for supporting a cushion of gas, such as an air cushion, between the nut and the leadscrew or shaft 18. Irregularities in the surface of the nut which faces the leadscrew may be tolerated to some degree, but such irregularities generally tend to degrade the integrity or effectiveness of the cushion, and therefore may affect the load bearing capacity of the device.

Similarly, the shaft is formed with a threaded portion which includes helical thread flanges, wherein the spaces between the thread flanges are filled with a non-magnetic material. As with the matching nut, the spaces between the thread flanges of the shaft are preferably filled with a non-magnetic material. The spaces between the thread flanges are further preferably filled until the nonmagnetic material reaches the top or distal end of the flanges, so that the internal surface of the leadscrew or shaft preferably has a generally smooth contour, in order to provide an adequately smooth and uniform surface for supporting a cushion of gas, such as an air cushion, between the leadscrew or shaft and the nut. Irregularities in the surface of the leadscrew which faces the nut may be tolerated to some degree, but such irregularities generally tend to degrade the integrity or effectiveness of the cushion, and therefore may affect the load bearing capacity of the device.

Furthermore, non-magnetic material may be deposited over the top or distal ends of the thread flanges, while not preferable, might be tolerated, for example in order to achieve a smooth contour with the magnetic material. However, such an overlayer of nonmagnetic material on the flanges will tend to degrade the integrity of the magnetic circuit existing between the nut and the shaft, so that, for example, the strength of the magnetic attraction is reduced, resulting in a lower breakthrough force for a matching nut and shaft, thereby limiting the amount of available or useful magnetic traction.

In another preferred embodiment the shaft is comprised of both non-magnetic and magnetic material. For example, the shaft may be largely made from non-magnetic or non-magnetizable material, such as aluminum or plastic, while the threaded flanges are made of a soft magnetic material. That is, the shaft does not need to be made entirely from soft magnetic material, as long as at least the thread flanges are made of such material. By way of further example, the shaft may be largely made from aluminum, while a magnetic strip may be deposited thereon to form the desired helical thread flange pattern. The resolution of the shaft and nut assembly may be changed or adjusted by varying the pitch "p" and/or the width "w" of the threaded portions. It should be noted that the aspect ratio of the thread flanges, such as those depicted in FIGS. 2 or 5, may be varied. Thus, the spacing between flanges need not equal the width of a flange. Moreover, the width of a flange need not equal its height. Such dimensions may be varied to achieve desired performance.

The internal radial surface of the nut assembly has a larger diameter than the outer diameter of the shaft, so that the nut assembly and shaft are separated by an annular gap therebetween.

Thus, pressurized air or other pressurized gases may be supplied to the gap, and any pocket, which exists between the nut assembly and the shaft, so that the nut assembly is suspended over the shaft without touching, or in other words, the shaft supports the nut assembly in a frictionless relationship.

Figure 3:
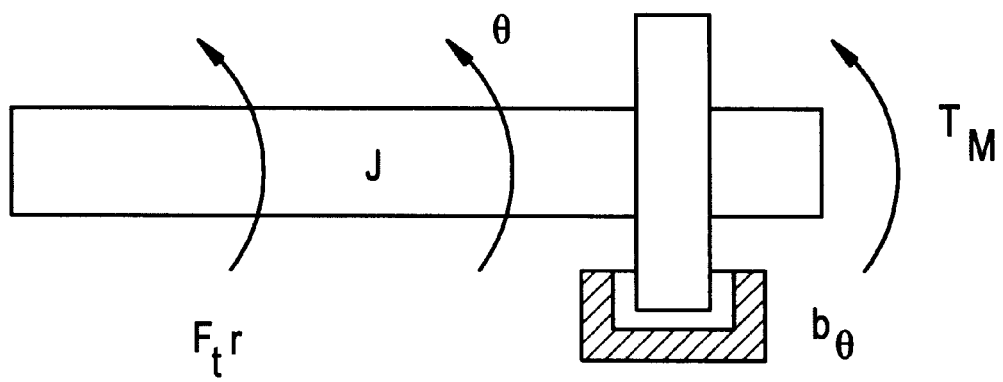
FIGS. 3 & 4 schematically illustrate a dynamic model of the motion in the in-feed (axial) direction.
Figure 4:
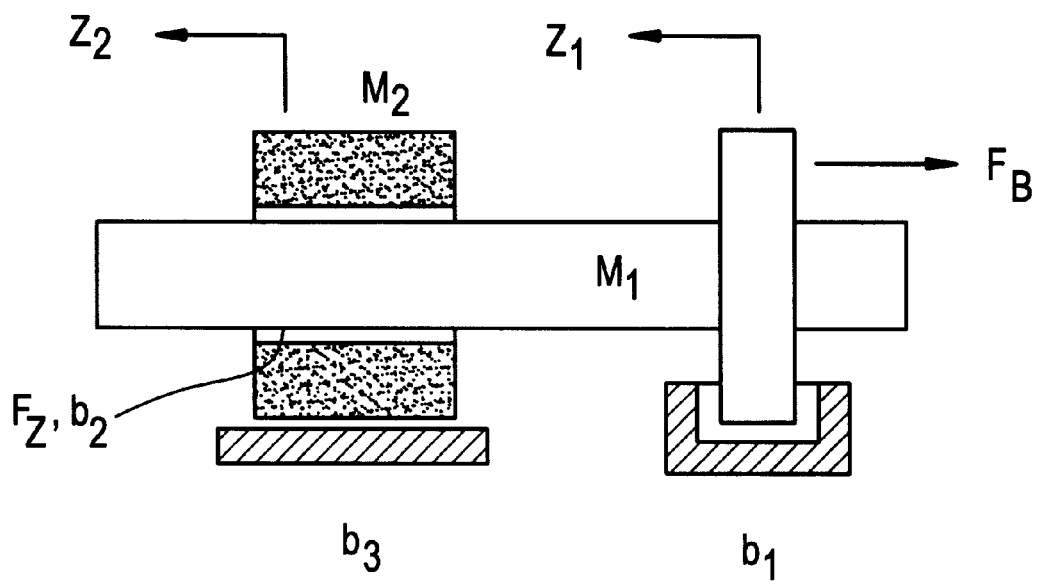

FIGS. 3 and 4 illustrate a dynamic model of the motion in the in-feed (axial) direction. The absolute position of the shaft and the nut in the axial direction may be defined as $z_1$, and $Z_2$, respectively. The rotation of the shaft may be defined as $\theta$ with the property that when $\theta=0$, $z_1=0$ and $z_2=0$, the threads of the nut and the leadscrew are aligned. The linear motion of the nut caused by the rotation of the leadscrew shaft can then be expressed as:

$$z_\theta = \frac{t_p}{2\pi} \theta \quad (1)$$

where $t_p$ is the pitch of the leadscrew.

If the tangential component of the total magnetic force on the shaft surface were equal to $F_t$, then the derived differential equation describing the rotation of the shaft may be described by the following:

$$J[|\$]\$"g\ddot{v}+b_\theta \dot{\theta}=T_m+F_t{}^*r \quad (2)$$

where r is defined as the radius of the leadscrew shaft which is driven by a contactless motor with torque $T_m$. The combined coefficient of viscous friction to the rotation in the air bearings is given by $b_\theta$. The moment of inertial of the shaft about its axis be given by J.

The linear motion of the shaft in the axial direction is caused by the axial component of the total magnetic force, $F_z$, on the shaft, the restoring force $F_B$ of thrust bearing, and viscous friction forces of the bearings. Therefore, the differential equation for the linear motion of the leadscrew would be:

$$M_1 \ddot{z}_1 + b_1 \dot{z}_1 + F_B = F_z + d \quad (3)$$

where $M_1$ and $b_1$ are, respectively, the mass of the leadscrew and the viscous damping coefficient. The disturbance "d" represents the effects of floor and motor vibrations.

Similarly, the linear motion of the nut in the axial direction is caused by the axial component of the total magnetic force, $F_z$, on the nut and can be described by the following differential equation:

$$M_2 \ddot{z}_2 + b_2 \left(\dot{z}_2 - \frac{t_p}{2\pi}\dot{\theta} - \dot{z}_1\right) = -F_2 \quad (4)$$

where $M_2$ and $b_2$ are, respectively, the mass of the nut (including a load) and the viscous damping coefficient.

Figure 5:
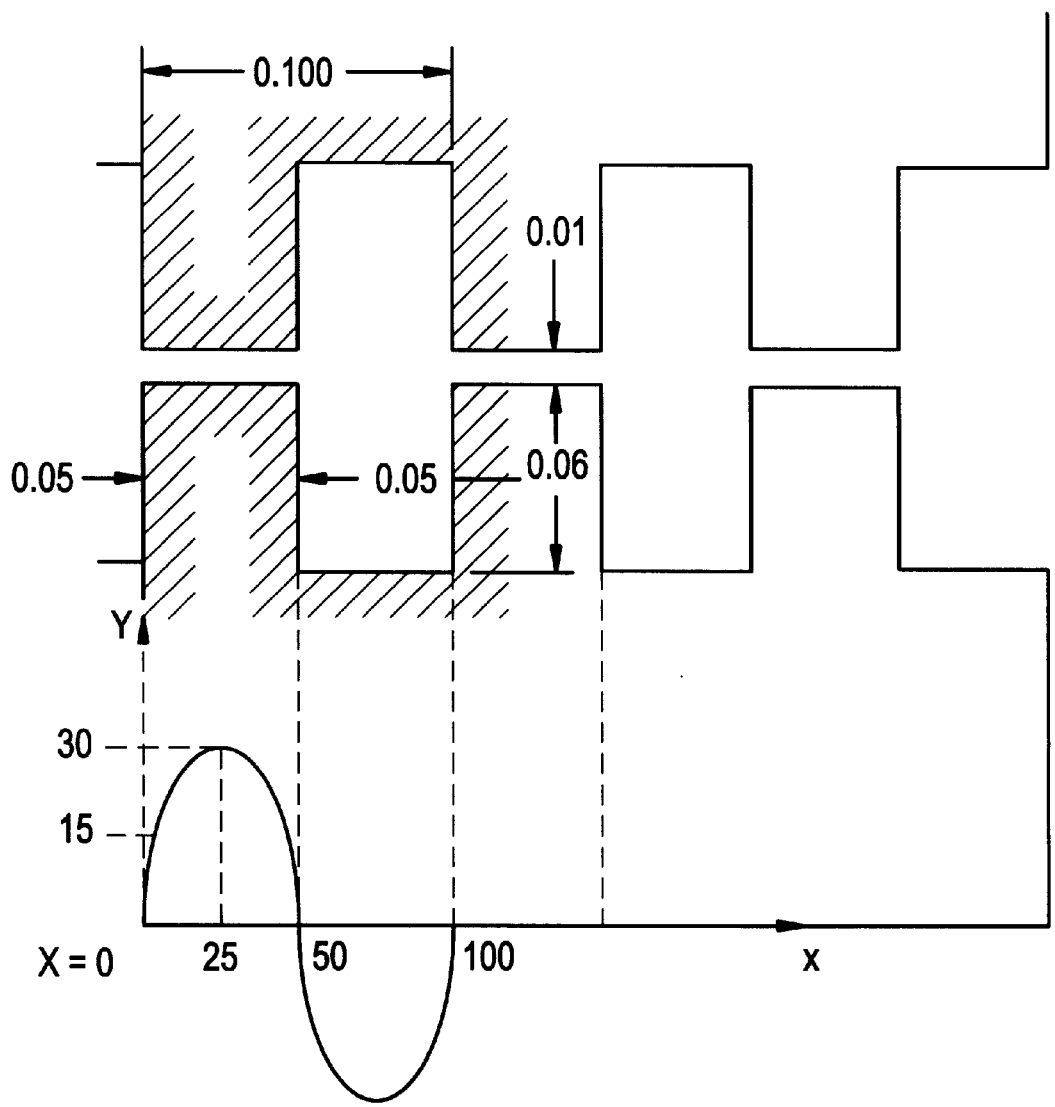
FIG. 5 illustrates experimental results showing the force-displacement characteristics of the nut and leadscrew or shaft.

FIG. 5 illustrates experimental results showing the magnetic coupling force between the nut and screw shaft in the axial direction wherein the relative displacement between the nut and screw under different forces were measured at twenty data points. The test data show that the magnetic force for axial coupling can be described by the following function:

$$F_z = F_{BT} \sin\left(2\pi \frac{z_2 - z_\theta - z_1}{t_p}\right) \quad (5)$$

where $F_{BT}$ is the break through force of the axial coupling and depends on the magnetic circuit and its magnetization.

Equation (5) shows that the relative axial motion between the nut and the screw caused by external force tends to produce misalignment which in turn bends the magnetic flux lines at the gap and increases the magnetic resistance. Magnetic forces are automatically generated to restore the flux lines and the alignment of threads. The break through force $F_{BT}$ occurs when the misalignment reaches $\frac{1}{4}t_p$. If the external force exceeds $F_{BT}$, then the thread of one component will be pushed toward the spacing of the other component. In order to prevent thread jumping, the operating force should therefore be less than $F_{BT}$.

Similar to mechanically coupled leadscrews, the magnetic force in the tangential direction can be related to the magnetic force in the axial direction as:

$$F_t = \frac{t_p}{2\pi * r} \cdot F_z \quad (6)$$

The stiffness and damping coefficients can be calculated based on the perturbed Reynolds equation with numerical method, or based on analogous electric circuits.

By way of example, representative parameters of a leadscrew may include: inertial properties $M_1=20$ kg, $M_2=10$ kg, and $J=0.002$ kg.m$^2$; shaft radius $r=12.5$ mm, thread pitch $t_p=0.1$ mm, and inlet air pressure for the bearings $=0.6$ MPa. Based on these particular parameters, the restoring force of the thrust bearings would be expressed as:

$$F_B = \frac{795.24}{10^{-5} - |z_1|} \cdot z_1 \quad (7)$$

Figure 6:
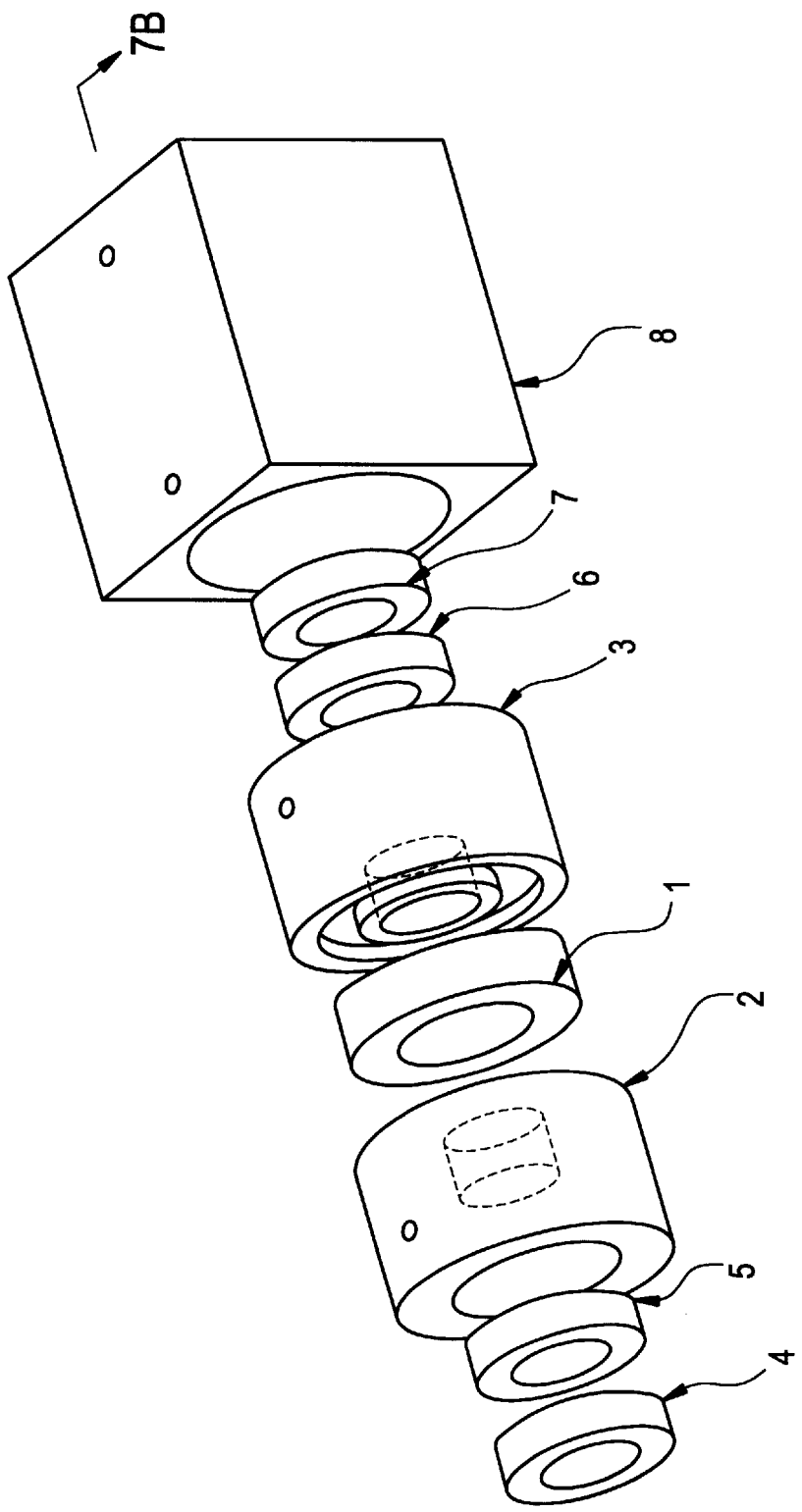
Figure 7B:
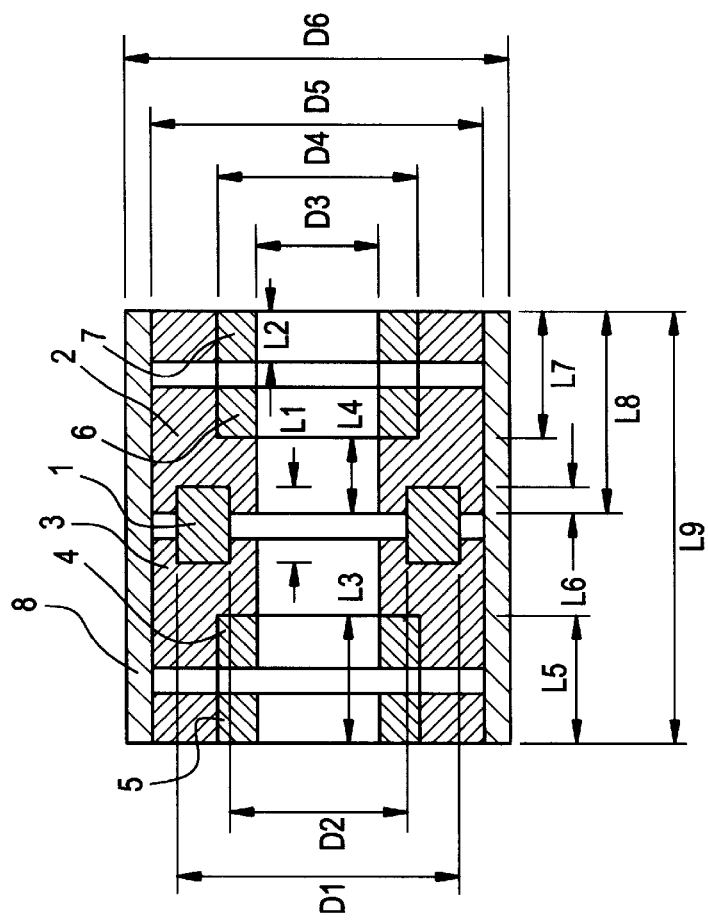
Figure 7C:
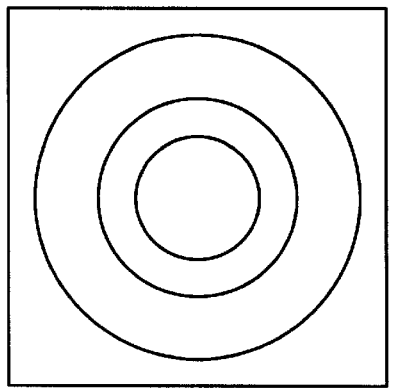
FIG. 7c is an end view of the magnetic nut assembly of FIG. 7b.
Figure 7A:
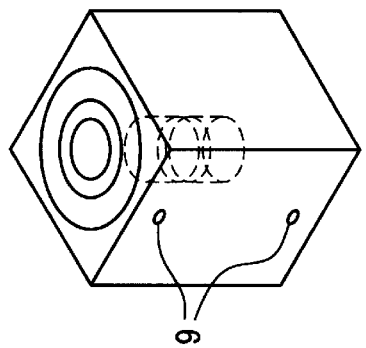
FIG. 7a is an assembled perspective view of the magnetic nut assembly of FIG. 6.

FIGS. 6–7 illustrate another embodiment of the magnetic nut assembly according to the present invention. The assembly includes a housing 8 which houses a magnet (permanent or electromagnet) 1, magnetizably threaded nut members 2 and 3, and rings 4, 5, 6, and 7. Magnet 1 provides a magnetic coupling field between threaded nuts 2, 3, and magnetizably threaded shaft A4 (FIG. 1). The nuts 2, 3, and shaft are preferably machined from soft magnetic materials such as low carbon steel, permalloy, etc. Together, the shaft A4 (FIG. 1) and nuts 2, 3 form a magnet circuit with magnet 1. Rings 4, 5, 6, and 7 are preferably made out of non-magnetic materials such as bronze, aluminum, etc., and provide bearing surfaces to prevent contact between nuts 2, 3, and the shaft, i.e. the rings provide additional surface area for developing an air cushion or air pocket. Inlet holes 9 are provided on the housing 8 to bring compressed air through the holes in nuts 2 and 3 to the pockets formed between the two pairs of rings (4 and 5, 6 and 7).

By way of example only, a nut constructed according to FIG. 7 could have the following dimensions in millimeters: D1=55; D2=35; D3=25; D4=40; D5=65; D6=75; L1=15; L2=10; L3=25; L4=15; L5=25; L6=5; L7=25; L8=40; and L9=85. It should be understood that these dimensions as well as any other dimensions stated herein, including those that may be found in the Figures, are given for illustration purposes only and that other various embodiments are, of course, contemplated by the present invention.

Thus, unlike a mechanically coupled leadscrew and nut, the threads in such aerostatic leadscrew and nut do not mesh into each other, but are aligned through magnetic attraction instead. Accordingly, "hard" nonlinearities are virtually eliminated. Magnetic coupling also makes it possible to produce finer pitch and therefore to achieve better resolution.

Testing of one embodiment of the present invention has achieved resolution of approximately 10 nanometers.

Another embodiment of the present invention concerns a contactless drive system for generating ultra-high precision rectilinear movement based on aerostatic suspension and magnetic traction. The device includes a nut, a leadscrew, a thrust bearing, a contactless motor, and feedback control including feedback drive electronics. The contactless motor provides actuation by turning the leadscrew, which is made of magnetically soft materials and which has a pitched helical groove machined on its surface. The leadscrew passes through the core of the nut, which is free to move in a rectilinear direction on a aerostatically suspended guide whereby rotation of the nut is prevented. The nut, also made with magnetic material, has a matching helical groove in its core so that a closed magnetic circuit is formed between the grooves of the leadscrew and the nut. The closed circuit in turn provides the necessary magnetic traction to move the nut in a rectilinear fashion. A primary aerostatic suspension is utilized to stabilize and center the leadscrew and nut transversally. A secondary transversal stabilization is provided by a thrust bearing to center the leadscrew in the axial direction.

It is contemplated that the present invention may preferably comprise a motor chosen from various types of contactless motors, such as brushless motors, which importantly include no mechanical ball bearings for supporting the rotor.

Thus, the present invention eliminates all surface friction, wherein only the friction generated by contact with the air or gas cushion remains. Air friction is typically characterized as a linear phenomenon. On the other hand, the dry contact friction or surface friction or Coulomb friction generated by previous devices has both static and dynamic aspects which introducing limiting factors into such devices. Elimination of contact friction contributes to the precision and repeatability of desired movements.

The cushion of gas between the leadscrew or shaft and the nut would typically be formed from a source or supply of compressed or pressurized air, as air is often readily available and economically supplied. However, in particular applications, an air mixture may not be desirable, such as where the local environment should not include the presence of oxygen. Thus, a gas or gases other than air, such as carbon dioxide or a noble gas or another gas or mixture of gases, may be used. Furthermore, the supply of gas must be delivered in a manner and amount which can sustain a suspension cushion between the various above-identified parts of the present invention. Moreover, such gas flow may provide a means of heat transfer or temperature control to the present invention, depending upon the thermofluid characteristics of the flow.

It should be understood that the magnetic source or magnet means may be disposed in either the male or female element of the present invention. For example, FIGS. 2, 6 and 7 show the magnet disposed in the female element, or nut, or nut assembly. However, the magnet may instead be placed within the male element, or shaft, or leadscrew, especially in particular embodiments where the male and female elements have similar length dimensions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

What is claimed is:

1. A low-friction, high precision device for transforming rotational motion into rectilinear motion comprising:

a rotatable male element;

a female element, wherein said female element is adapted to fit over said male element such that said female element is separated from said male element by a first pressurized gap, wherein said female element is cushioned upon said first pressurized gap; and means for supporting said female element upon a second pressurized gap and for allowing said female element to translate parallel to said male element while preventing said female element from rotating, wherein rotation of said female element is capable of being resisted by said second pressurized gap, whereby said female element is suspended by said first and second pressurized gaps, and whereby said female element is vibrationally isolated;

wherein said male and female elements are magnetically coupled across said first pressurized gap; and wherein rotation of said male element is capable of causing said female element to translate parallel to said male element by magnetic traction;

whereby translation of said female element is substantially frictionless.

2. The device according to claim 1 wherein said male element comprises a magnetic source for inducing a magnetic circuit between said male and female elements.

3. The device according to claim 1 wherein said female element comprises a magnetic source for inducing a magnetic circuit between said male and female elements.

4. A low-friction, high precision device for transforming rotational motion into rectilinear motion comprising:

a male element;

a female element, wherein said female element is adapted to fit over said male element such that said female element is separated from said male element by a first gap, said female element including gas inlet means for allowing compressed gas to enter said first gap, thereby allowing the formation of a first gas support cushion between said male and female elements, whereby said first cushion is capable of maintaining the separation of said male and female elements; and a guide element for allowing said female element to translate parallel to said male element and for preventing said female element from rotating, wherein said guide element and said female element are separated by a second gap, said guide element including gas inlet means for allowing the compressed gas to enter said second gap, thereby allowing the formation of a second gas support cushion between said female element and said guide element, whereby rotation of said female element is capable of being resisted by said second cushion;

wherein said female element is capable of being suspended by said first and second cushions;

wherein said male and female elements are magnetically coupled; and wherein rotation of said male element is capable of causing said female element to translate parallel to said male element by magnetic traction;

whereby translation of said female element is substantially frictionless;

whereby said female element is vibrationally isolated.

5. The device according to claim 4 further comprising a contactless bearing, wherein at least one end of said male element is rotatably mounted in said contactless bearing.

6. The device according to claim 5 wherein said contactless bearing further comprises means for providing a gas cushion to resist axial thrust loads.

7. The device according to claim 5 wherein said contactless bearing further comprises means for providing a gas cushion to resist transverse journal loads.

8. The device according to claim 4 further comprising control means for translating said female element to a desired position.

9. The device according to claim 8 wherein said control means further comprises means for sensing the position of said female element.

10. The device according to claim 4 wherein said male and female elements further comprise matching magnetic portions helically disposed on opposite sides of said first gap.

11. The device according to claim 10 wherein the outer surface of said male element corresponding to its magnetic portion is substantially smooth.

12. The device according to claim 10 wherein the inner surface of said female element corresponding to its magnetic portion is substantially smooth.

13. The device according to claim 4 wherein said female element is aerostatically suspended.

14. The device according to claim 4 wherein said male element is an elongate shaft.

15. The device according to claim 4 wherein said female element is a nut.

16. The device according to claim 4 further comprising a contactless motor for rotating said male element.

17. A drive system comprising:
 a compressed air source;
 a drive motor having a rotor and a stator;
 a leadscrew attached to said rotor, said leadscrew having an outer surface including a magnetizable portion with a helical flange defining a first helical groove, said magnetizable portion having an outer diameter; and
 a nut having:
  an outer surface;
  an inner radial surface, including a magnetizable portion with a helical flange defining a second helical groove, wherein said first helical groove matches said second helical groove, and wherein said magnetizable portion has an inner diameter greater than said outer diameter of said magnetizable portion of said leadscrew, thereby forming a gap between said nut and said leadscrew; and
  a magnetic source disposed between said inner radial surface and said outer surface;
 wherein said nut is provided with at least one air passage between said outer surface and said inner radial surface;

wherein said compressed air source is connected to said air passage to provide air to said gap, thereby creating an air cushion between said nut and said leadscrew, whereby said nut is substantially prevented from contacting said leadscrew;

wherein said magnetic source induces a closed magnetic circuit through said magnetizable portion of said nut and said magnetizable portion of said leadscrew; and wherein rotation of said leadscrew causes said helical flange of said magnetizable portion of said leadscrew to magnetically attract said helical flange of said magnetizable portion of said nut, thereby causing said nut to translate rectilinearly along said leadscrew.

18. The drive system according to claim 17 further comprising a guide means for substantially preventing said nut from rotating.

19. The drive system according to claim 18 wherein said guide means comprises:
 a slide attached to said nut; and
 a slide guide adapted to allow said nut to travel rectilinearly therethrough.

20. The drive system according to claim 19 wherein said slide and said slide guide are substantially preventing from contacting each other by a cushion of compressed air maintained therebetween.

21. The drive system according to claim 17 wherein said motor further comprises a contactless motor.

22. The drive system according to claim 17 further comprising a contactless bearing for supporting said rotor.

23. The drive system according to claim 17 wherein said inner radial surface of said nut further comprises at least one nonmagnetic portion.

24. The drive system according to claim 17 wherein said first helical groove is filled with a nonmagnetic filler material.

25. The drive system according to claim 17 wherein said first helical groove is filled with a nonmagnetic filler material until flush with said helical flange, thereby imparting a smooth finish to said outer surface of said leadscrew.

26. The drive system according to claim 17 wherein said second helical groove is filled with a nonmagnetic filler material.

27. The drive system according to claim 17 wherein said second helical groove is filled with a nonmagnetic filler material until flush with said helical flange, thereby imparting a smooth finish to said inner radial surface of said nut.

28. The drive system according to claim 17 wherein said inner radial surface of said nut is provided with an indented portion which forms an air pocket between said nut and said leadscrew.

29. The drive system according to claim 17 wherein said magnetic source is a permanent magnet.

30. The drive system according to claim 17 wherein said magnetic source is an electromagnet.

31. A method for precisely transforming rotational motion of a first element into rectilinear motion of a second element comprising:
 aerostatically suspending the second element while simultaneously preventing the second element from rotating;
 aerostatically suspending the first element magnetically coupling the first and second elements; and
 rotating the first element.

32. The method according to claim 31 further comprising rotating the first element with a contactless motor.

* * * * *